July 12, 1966  W. G. WOOD  3,259,909
LENS MOUNTING MEANS FOR GOGGLES
Filed April 17, 1964

INVENTOR.
WILLIAM G. WOOD
BY
his ATTORNEY

United States Patent Office 3,259,909
Patented July 12, 1966

3,259,909
LENS MOUNTING MEANS FOR GOGGLES
William G. Wood, Douglassville, Pa., assignor to The Electric Storage Battery Company, Philadelphia, Pa.
Filed Apr. 17, 1964, Ser. No. 360,489
1 Claim. (Cl. 2—14)

This invention relates to a pair of goggles and, more particularly, to means for detachably mounting the lenses, of such goggles, easily and quickly and yet assuring a water-tight or air-tight fit.

In the past, lenses on goggles have usually been mounted on the flexible eye-surrounding shield by screwing annular elements onto screw threaded annular projections emerging from the front surface of the shield and surrounding the lenses. These lenses, although including washers or sealing rings, have the disadvantage of being dependent on how tight they are screwed onto the threaded annular projections for a water-tight or air-tight seal. Another disadvantage is that such goggles are relatively complicated and expensive to manufacture.

An object of my invention is to overcome the above named disadvantages and to provide a novel detachable sealing ring for goggles which is relatively simple in construction and inexpensive to manufacture and which, when snapped in place, assures an air-tight and water-tight seal.

Another object of the present invention is to provide a novel mounting and sealing means for a pair of lenses on a goggle eye shield to enable the lenses to be easily and quickly replaced in an air-tight manner.

Other objects and advantages will become more apparent from a study of the following description taken with the accompanying drawing wherein.

Figure 1:
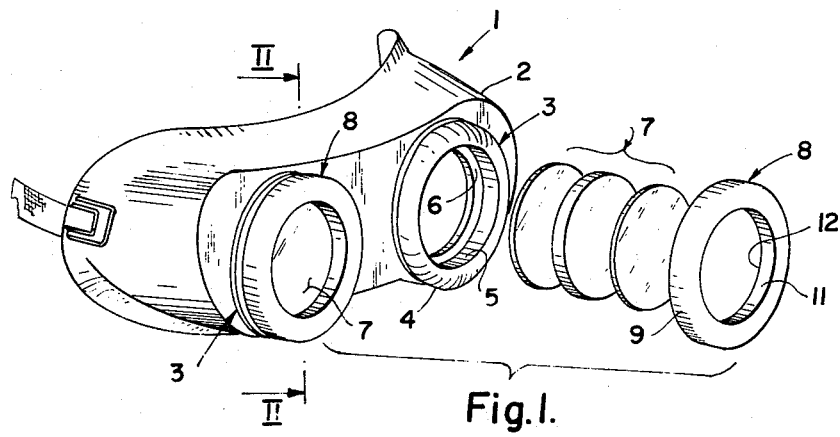
FIG. 1 is a perspective view of a pair of goggles having lens-mounting assemblies embodying the present invention and in which one of the lens assemblies is shown exploded for purposes of clarity.

Referring more particularly to FIG. 1 of the drawing, numeral 1 generally denotes a goggle eye shield, preferably made of rubber, plastic, or other suitable flexible material so that the mouth or perimeter thereof will form a substantially air-tight fit about the eyes of the wearer. The goggle eye shield comprises side walls 2 and a flat front wall which is either vertical, or downwardly and inwardly inclined towards the wearer. There is integrally formed, on the front wall, upstanding annular beads 4 with rounded perimeters, as shown more clearly in FIG. 3. The radially inward surface of bead 4, denoted by numeral 5, is cylindrical so as to receive a lens or a lens assembly, generally denoted by numeral 7 in FIG. 2. Such assembly might comprise colored lenses 13 in between which is sandwiched a main lens 14 of glass or transparent plastic material, or vice versa.

Figure 4:
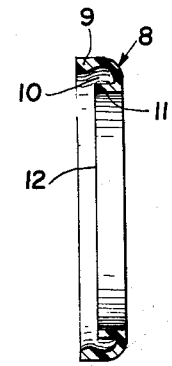
FIG. 4 is a cross-sectional view of the plastic mounting ring which is adapted to snap onto portion 4 as shown in FIGS. 1 and 2.

After the lens assembly is slipped into place, it is arrested by shoulder 6 which serves as a stop element. A mounting ring or cap, denoted generally by numeral 8 in FIG. 4, and preferably of polyethylene or other suitable plastic material, is then slipped and snapped onto bead 4, as shown in FIG. 2, because of its slight flexibility, at which time its annular wall portions 9 and 11 slightly separate due to the camming action of bead 4 as such bead is projected into the groove or annular well 10.

It will be readily apparent that when it is desired to replace, for example, the outer lens 13 which may have become pitted as the result of industrial use, such as from chipping or welding, mounting ring 9 is pulled outwardly or unsnapped from bead 4 by slight outward spreading of walls 9 and 11 thereof so that when released, end surface 12 and shoulder 6 will yieldingly compress lens assembly 7.

Figure 2:
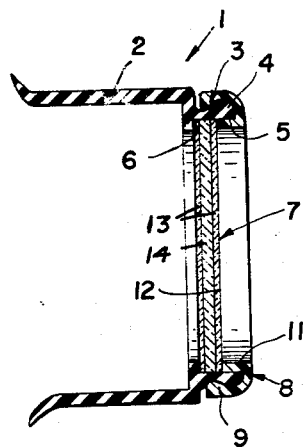
FIG. 2 is a vertical, cross-sectional view taken along line II—II of FIG. 1.
Figure 3:
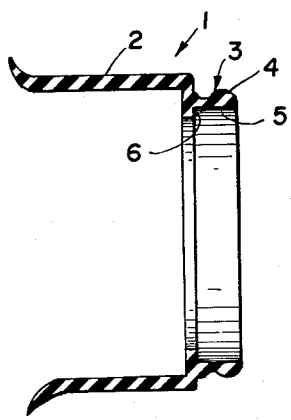
FIG. 3 is a view similar to FIG. 2 except showing only the integral component parts of the eye shield.

An important feature of the invention resides in the fact that when the mounting ring 8 is snapped into place, as shown in FIG. 2, it will inherently cause sufficient compression of the peripheral portions of the lenses by the confronting end walls to assure a substantially air-tight fit. Thus the assembly is more fool-proof for air-tightness and yet is relatively simple and inexpensive in construction.

Thus it will be seen that I have provided an efficient lens mounting assembly for a pair of goggles, including readily detachable parts which may be easily fitted together without the necessity of screw threads and which, when snapped into place, will give an assured air-tight seal; furthermore, I have provided lens mounting means for a pair of goggles which makes it extremely easy to replace the lenses and which involves a minimum number of relatively simple and inexpensive parts which greatly reduce manufacturing costs.

While the caps or retainer rings 9 have been described as being flexible, as well as the supporting beads 4, the rings 9 may be of rigid material instead, or the rings 9 may be flexible and the beads 4 rigid, or both may be slightly flexible.

While I have illustrated and described a single specific embodiment of my invention, it will be understood that this is by way of illustration only, and that various changes and modifications may be made within the contemplation of my invention and within the scope of the following claim.

I claim:

A pair of goggles comprising an eye shield having a pair of lens openings in the front portion thereof, annular shoulder portions integrally formed on the front face of said shield and surrounding said openings, said shoulder portions terminating in annular, radially outwardly projecting beads, lens means contained within said portions, and an annular cap of slightly flexible plastic material which is detachably fitted on each bead, said caps each having a substantially U-shape cross-section defining an annular well into which said beads are projected so as to cause the legs of the U to flex outwardly and then snap into locking engagement with said beads to assure an air-tight fit with said lens means, one of said legs of each U embracing said shoulder portion, the other leg snugly embracing the radially inward surface of the bead with its extremity pushing against the outer peripheral portion of said lens means to assure an air-tight fit.

References Cited by the Examiner
UNITED STATES PATENTS

| | | | |
|---|---|---|---|
| 1,060,083 | 4/1913 | Harris | 2—14.8 |
| 1,925,588 | 9/1933 | Gagnon | 2—14 |
| 2,122,461 | 7/1938 | Fischer | 2—14.4 |
| 2,903,700 | 9/1959 | Finken et al. | 2—14 X |

JORDAN FRANKLIN, Primary Examiner.

J. R. BOLER, Assistant Examiner.